March 11, 1941.  O. J. POUPITCH  2,234,194
LOCK WASHER AND METHOD OF PRODUCING SAME
Filed April 29, 1938  4 Sheets-Sheet 1
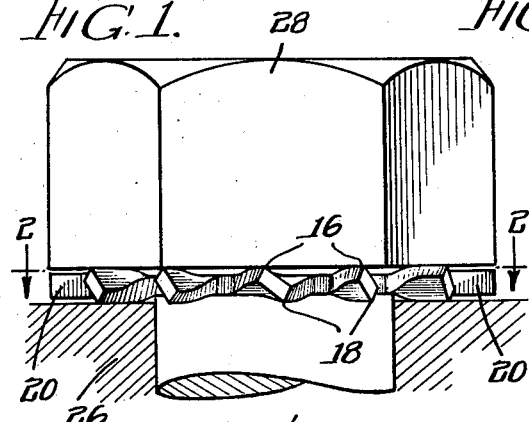
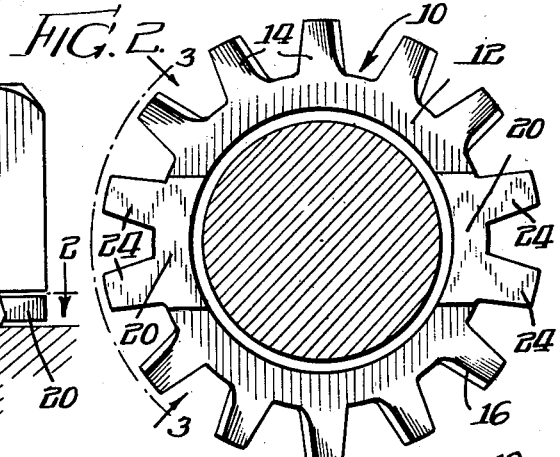
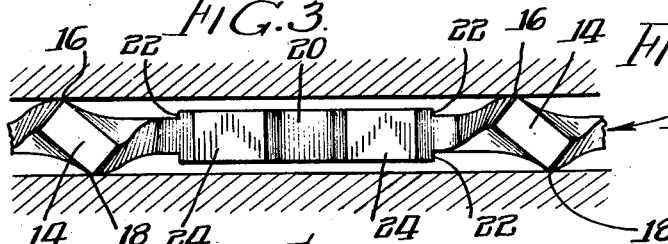
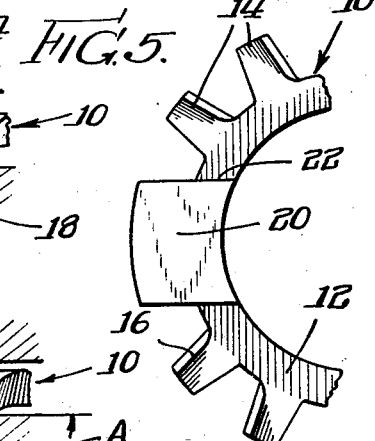
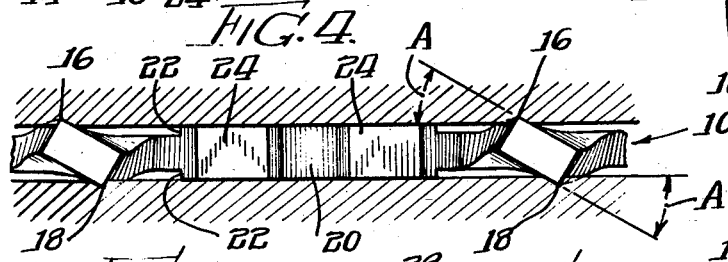
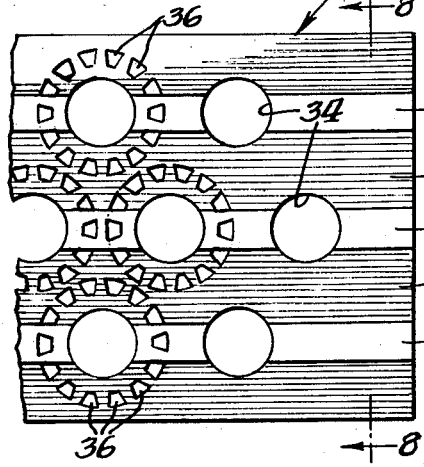
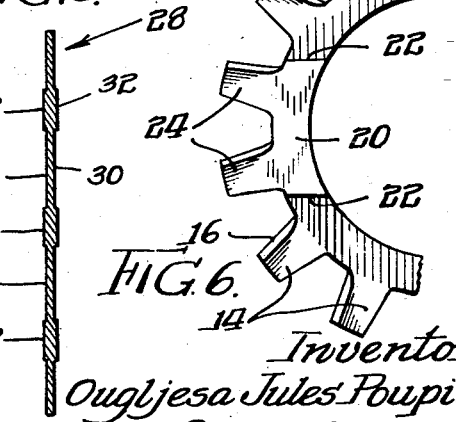
Inventor
Ougljesa Jules Poupitch
By: Cox & Moore attys March 11, 1941. O. J. POUPITCH 2,234,194
LOCK WASHER AND METHOD OF PRODUCING SAME
Filed April 29, 1938 4 Sheets-Sheet 2
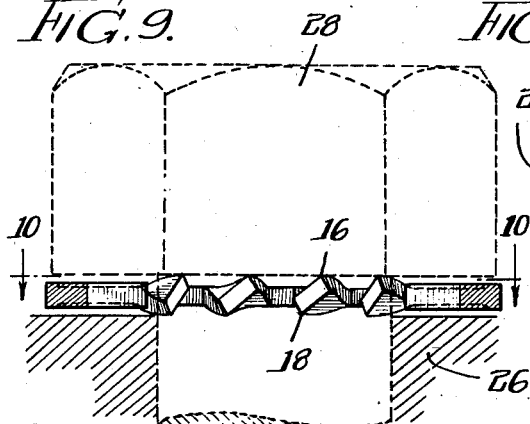
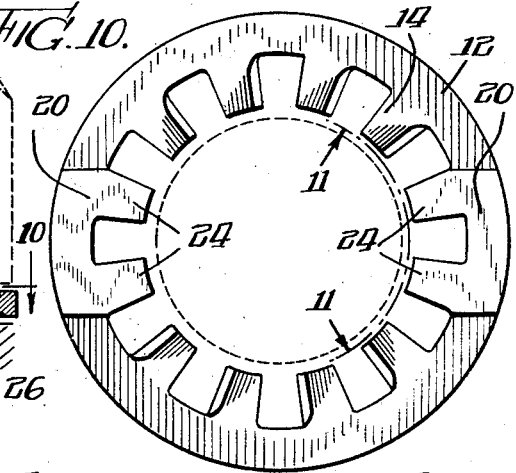
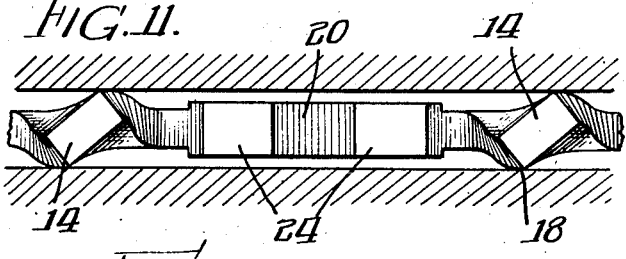
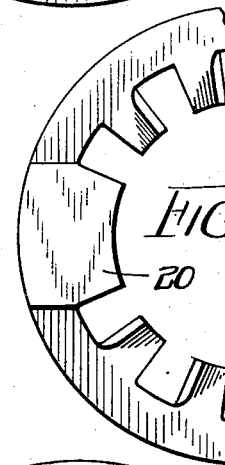
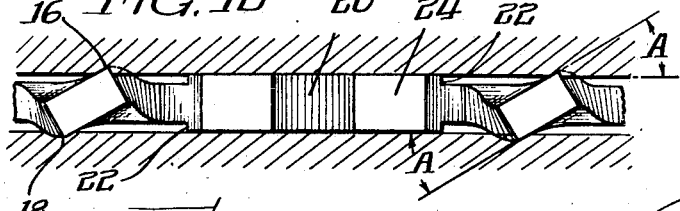
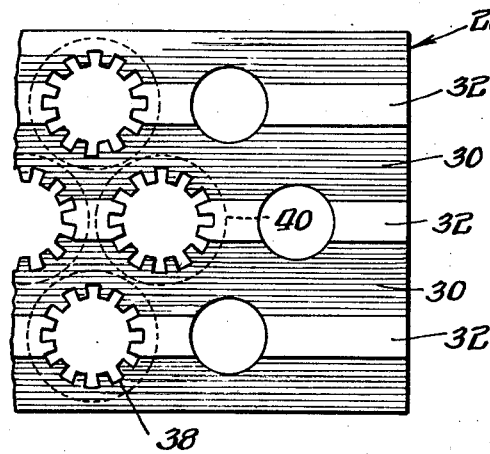
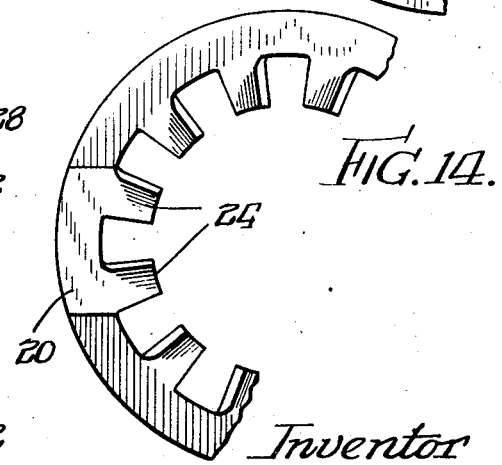
Inventor
Ougljesa Jules Poupitch
By:- Orr & Moore attys March 11, 1941.   O. J. POUPITCH   2,234,194
LOCK WASHER AND METHOD OF PRODUCING SAME
Filed April 29, 1938   4 Sheets-Sheet 3
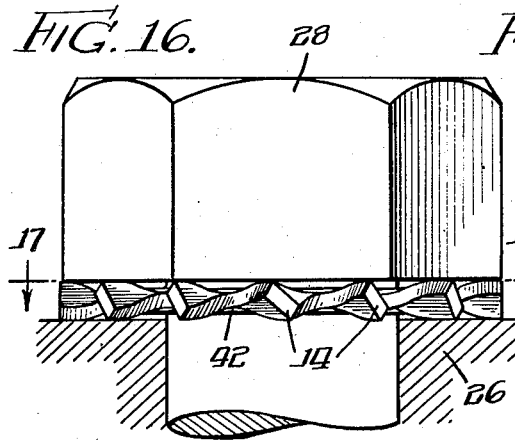
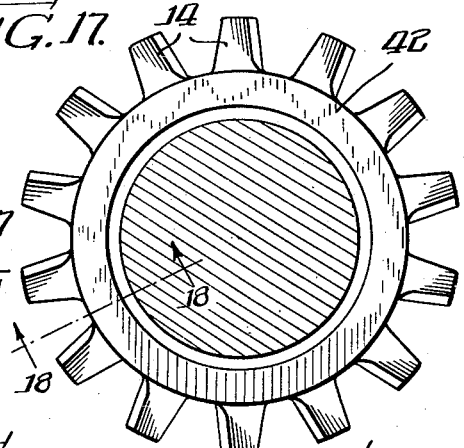
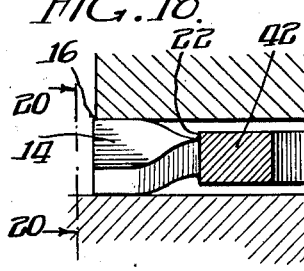
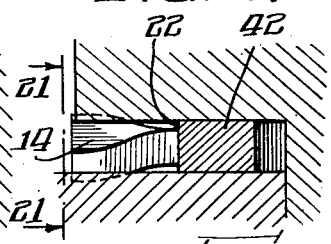
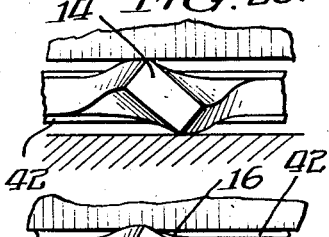
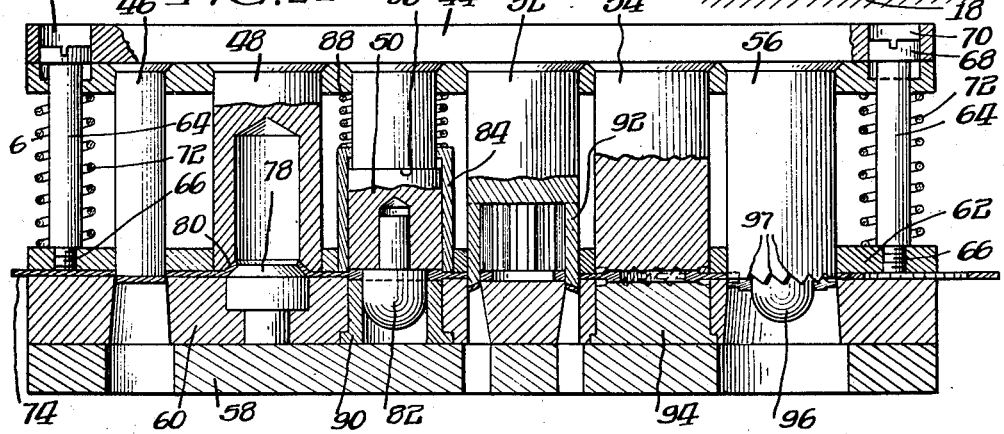
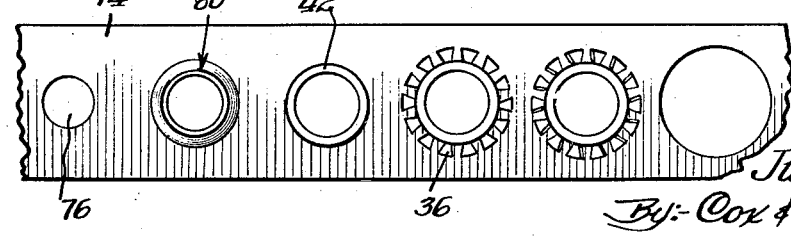
Inventor
Ougljesa
Jules Poupitch
By: Cox & Moore attys.

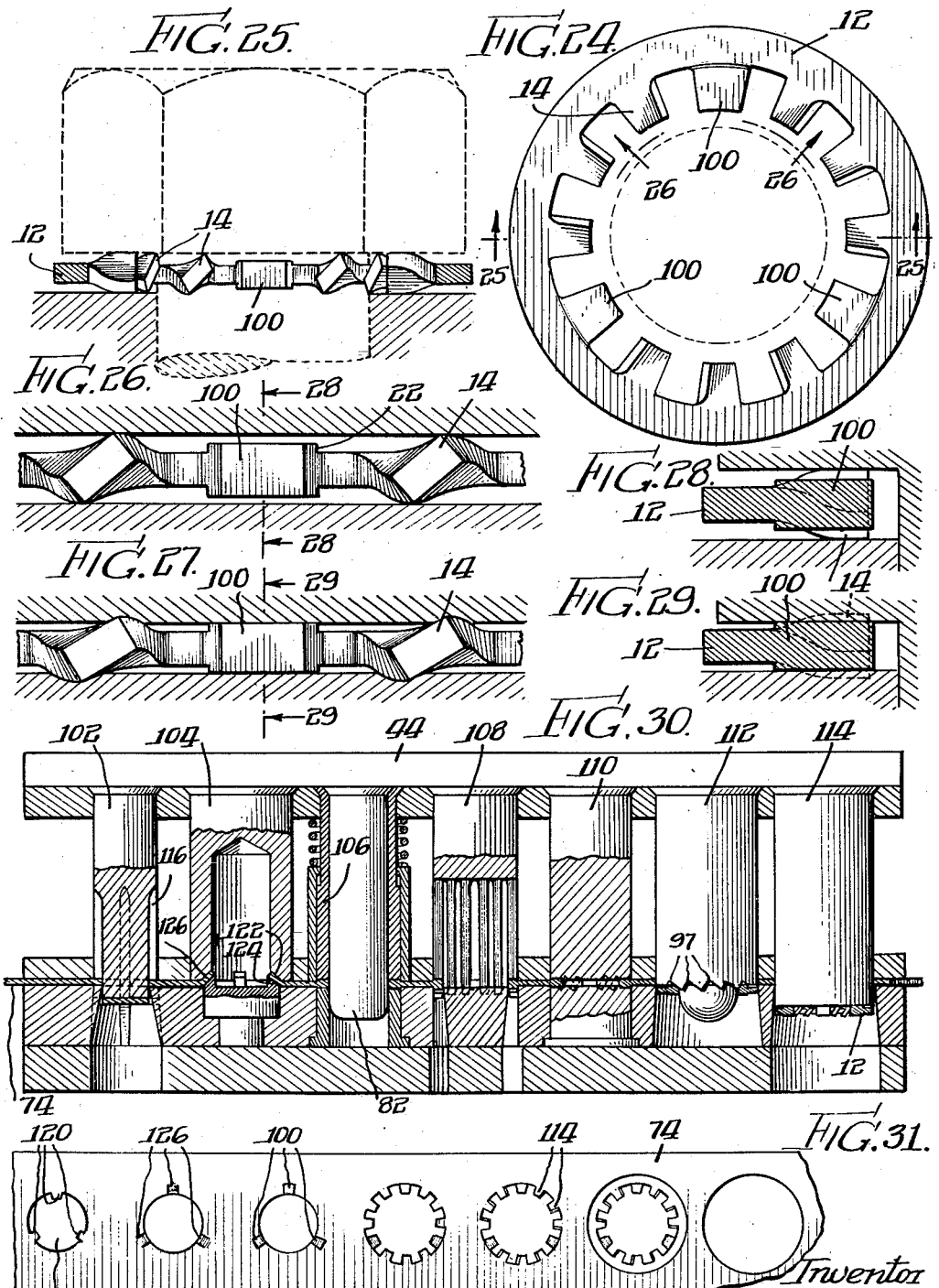

Patented Mar. 11, 1941

2,234,194

UNITED STATES PATENT OFFICE 2,234,194

LOCK WASHER AND METHOD OF PRODUCING SAME

Ougljesa Jules Poupitch, Chicago, Ill., assignor to Illinois Tool Works, Chicago, Ill., a corporation of Illinois Application April 29, 1938, Serial No. 204,953

18 Claims. (Cl. 10—86)

The present invention relates to lock washers and more particularly to lock washers having a plurality of locking teeth or prongs disposed about the axes thereof.

The present invention more particularly comprehends the provision of a lock washer having a continuous, uninterrupted body with locking prongs and/or locking teeth extending therefrom for interengagement on opposed work surfaces, and contemplates the formation upon the washer of thickened or raised areas adapted to insure the interlocking of the interengaging teeth against retrograde movement of the work pieces at all times. More particularly the effect of the present novel structure is to cause the locking prongs to engage the opposed work surfaces when these surfaces are clamped together with great force in such a manner as to exert a strutting action when the work pieces move in a predetermined retroactive direction. Under the influence of severe clamping forces applied to many lock washers of hitherto known types, the locking teeth or prongs may be flattened or otherwise deformed to a position wherein their strutting action is destroyed or lessened. It has been attempted to obviate this defect by thinning or otherwise specially shaping the locking teeth and prongs, but in general any improved effect has been attained at a sacrifice of the individual tooth locking efficiency.

It is accordingly an object of the present invention to provide an integral lock washer of the above type having thickened portions adapted to space the opposed work surfaces a distance corresponding to that essential for the production of a desired tooth locking efficiency, but wherein the work spacing portion or portions are arranged at positions removed or spaced, in the plane of the washer, from the teeth so that they do not modify the form of the teeth or prongs or necessitate special shaping or distortion thereof and thus permit the teeth to have a form consistent with maximum locking efficiency.

Another object of the present invention is to provide a lock washer as above, having a continuous integral body of uniform physical characteristics throughout its extent and adapted to manufacture from sheet stock by the use of stamping or shearing machinery.

It is an additional object of the present invention to provide a lock washer as above having an annular body and a plurality of warped, twisted or deflected locking prongs, the washer further comprising relatively thickened areas spaced from the said locking prongs and having a thickness greater than that of the prongs for determining the minimum degree of twist of the prongs when forces are applied tending to flatten out the washer.

The present invention additionally contemplates the method of manufacturing the above lock washers by resort to a series of stamping operations upon sheet stock material, and aims to provide thickened portions at points spaced from the locking prongs, without additional machining or fabrication.

It is a further object of the present invention to provide a process for manufacturing lock washers having relatively thickened areas at predetermined areas in the plane of the washer, by causing the material of the washer to flow into the thickened areas under the influence of forming pressures.

More specifically it is another object of the present invention to form the above predetermined work spacing portions of the lock washer by controlled upsetting of preselected areas thereof while permitting the locking prong portions to retain their normal predetermined thickness.

Numerous other objects, advantages and inherent functions of the invention will become apparent as the same is more fully understood from the following description when taken in connection with the accompanying drawings, wherein:

Fig. 1 is an elevational view showing a lock washer constructed in accordance with the present invention and arranged in operative position between opposed work pieces;

Fig. 2 is a sectional view taken on the line 2—2 in Fig. 1;

Fig. 3 is a developed elevational view of the washer, taken on the line 3—3 in Fig. 2 and showing the washer in operative position between opposed work pieces, the work pieces being shown in section.

Fig. 4 is a view the same as Fig. 3 but showing the work pieces clamped together under the influence of a relatively severe clamping force.

Figs. 5 and 6 are partial detail plan views of alternative modified forms of washers constructed in accordance with the present invention;

Fig. 7 is a plan view of a sheet of stock material, showing the initial steps in the formation of the washer of Figs. 1, 2 and 6;

Fig. 8 is a sectional view taken on the line 8—8 in Fig. 7;

Fig. 9 is an elevational view the same as Fig. 1, but showing a washer constructed in accordance with the present invention and having internal locking prongs;

Fig. 10 is a plan view of the washer shown in Fig. 9, and taken on line 10—10 in Fig. 9;

Fig. 11 is a developed elevational view taken on the line 11—11 in Fig. 10 and showing the work pieces in section;

Fig. 12 is a view the same as Fig. 11 but showing the work pieces forced together under the influence of a relatively great locking force;

Figs. 13 and 14 are partial plan views of modified forms of internal tooth lock washers constructed in accordance with the present invention;

Fig. 15 is a plan view of a strip of sheet material indicating the initial steps of configurating the sheet material in the manufacture of the washer of Figs. 9, 10 and 14;

Fig. 16 is an elevational view showing a lock washer constructed in accordance with the present invention and having a continuous annular body portion of relatively increased thickness, the washer being shown in operative position between opposed work pieces;

Fig. 17 is a sectional plan view taken on the line 17—17 in Fig. 16;

Fig. 18 is a detail sectional view taken on the line 18—18 in Fig. 17 and showing the washer in initial position between the work pieces;

Fig. 19 is a view the same as Fig. 18 but showing the work pieces forced together under the influence of a severe clamping pressure;

Fig. 20 is an elevational view taken on the line 20—20 in Fig. 18;

Fig. 21 is an elevational view taken on the line 21—21 in Fig. 19;

Fig. 22 is an elevational view partly in section showing a progressive stamping or forming die for manufacturing lock washers of the type shown in Figs. 16 to 21;

Fig. 23 is a plan view of the strip of sheet metal shown in the die in Fig. 22 and indicating the function of the several parts of the die;

Fig. 24 is a plan view of an internal tooth lock washer constructed in accordance with the present invention;

Fig. 25 is a sectional view taken through the lock washer of Fig. 24 on the line 25—25 thereof, a lower work piece being shown in section and a coacting work piece, comprising a bolt, being indicated by the dotted lines;

Fig. 26 is a developed elevational view taken on the line 26—26 in Fig. 24 and showing the washer in operative position between work pieces;

Fig. 27 is a view the same as Fig. 26 but showing the work pieces clamped together under the influence of a severe clamping force;

Fig. 28 is a detail sectional view taken on the line 28—28 in Fig. 26;

Fig. 29 is a detail sectional view taken on the line 29—29 in Fig. 27;

Fig. 30 is an elevational view taken through a die of the progressive type adapted for the manufacture of lock washers of the type shown in Figs. 24 to 29, inclusive. It should be noted that Fig. 30 is adapted to disclose the formation of a washer having three thickened portions spaced equally about its annular body. Since it is an object of Fig. 30 to more specifically indicate the formation of these thickened portions, it will be noted that the section lines do not extend diametrically through the forming parts of the die but project radially thereof at an angle of sixty degrees with respect to the plane of the figure; and Fig. 31 is a plan view of the strip of material used for forming the lock washers in the die in Fig. 30 and serves to indicate the effect of the several steps in the operation of the progressive dies shown in Fig. 30.

Referring to the drawings, wherein the present invention is illustrated more in detail, Figs. 1 to 4 relate to one preferred form of lock washer 10 constructed in accordance with the present invention. This lock washer comprises a central annular section 12 provided with a plurality of radially extending locking prongs 14 spaced about the periphery thereof. These locking prongs are of specifically known configuration, comprising, in the embodiment shown, tapered, outwardly extending sides. Each of the prongs is twisted or warped bodily through a small angle about its radial axis, as shown more clearly in Figs. 3 and 4, to provide opposed longitudinally extending upper and lower biting edges 16 and 18, respectively, which extend outwardly of the normal plane of the washer body for interengagement with opposed work surfaces.

The lock washer shown in Figs. 1 to 5 has an annular configuration which is interrupted by thickened or work spacing portions indicated generally by the reference numeral 20. These thickened portions are arranged so that their central plane is in coplanar relationship with the aforementioned body portion of the lock washer, but have a transverse thickness which is relatively greater than the transverse thickness of the material forming the remainder of the lock washer, and particularly the body portion, as shown in Figs. 3 and 4. Thus the thickened or work spacing portions 20 of the lock washer extend beyond the normal bounding planes of the body portion a distance indicated by the upwardly extending shoulders 22. It should be noted that in the embodiment shown, the thickened areas 20 extend from the inner boundary of the washer to the outer periphery thereof, including the prong shaped portions 24. In this embodiment, however, the prong shaped portions 24 are not deformed in any degree out of the normal plane of the flat thickened portions and accordingly will not normally perform any locking function.

The method of use of the aforementioned locking washer is clearly disclosed in Figs. 1, 3 and 4, wherein the washer is shown in operative position between a lower work piece 26 and an upper work piece comprising a bolt indicated by the reference numeral 28. When the parts are originally arranged as shown in Fig. 1, and before clamping pressure is applied thereto, the washer 10 will possess its normal peripheral configuration, indicated in Fig. 3. As tightening of the work pieces progresses, for example, if it be assumed that the bolt 28 is tightened in a clockwise direction, the upper work piece 28 gradually approaches the lower work piece 26 against the resilient tension of the locking teeth 14. In other words, since the force tending to draw together the two work pieces is applied solely against the opposed teeth or edges 16 and 18 of the locking prongs, a force is created tending to rotate each of the prongs in a counter-clockwise direction, as viewed in Fig. 3. The prongs accordingly, as tightening of the fastener progresses, tend to approach a position wherein they reside substantially in the plane of the body portion of the washer, while at the same time the inherent elastic resiliency of the material forming the washer tends to urge the tooth portions 16 and 18 of the prongs into interlocking or biting engagement with the opposed surfaces of the work pieces. If it is attempted to apply retrograde movement to the work pieces, the several prongs of the washer will be subjected to an influence tending to force them in a clockwise direction, as viewed in Fig. 3, creating a strutting action effectively inhibiting disassembly of the parts.

It should be noted that if sufficient force were applied between the work pieces to flatten the prongs out in the plane of the body portion, then the locking action would be substantially decreased or destroyed entirely. It has been found in accordance with the present invention that there is a predetermined angle of any particular prong with the work pieces which produces the maximum desired locking efficiency. In other words, if the prong is twisted in a counter-clockwise direction, as viewed in Figs. 3 and 4, so that it makes an angle with the work surfaces below a certain predetermined minimum, the locking action will be materially reduced. Referring more specifically to Fig. 4, the angle which the surfaces of the prong 14, and accordingly the plane of the prong itself, make with the adjacent work surfaces is indicated by the letter A. Attention is particularly directed to the fact that this angle is carefully controlled and predetermined by reason of the relatively increased thickness of the work spacing portion 20. In other words, the thickened portion spaces the body of the washer and accordingly the root portions of the prongs from the work surfaces a distance substantially equivalent to the shoulders 22. It will be obvious from this disclosure that no amount of tightening of the parts will be effective to twist the prongs substantially from the angular relationship at which they are shown in Fig. 4, and therefore regardless of the abnormal tension with which the parts may be assembled, the present lock washer will at all times effectively maintain the structure in the proper assembled relationship with a maximum predetermined locking efficiency.

It is not necessary in accordance with the present invention to provide the prong shaped portions 24 on the thickened work spacing part 20 of the washer. There is illustrated in Fig. 5 an alternative modified preferred form of the present invention wherein the thickened portion 20 is provided with an outer peripheral edge comprising a regular curve concentric with the inner edge thereof.

There is illustrated in Fig. 6 a further modified preferred form of the present invention wherein the prong portions 24 of the work spacing thickened section 20 are twisted or deflected in substantially the same manner as the aforementioned prongs 14 to produce such additional interlocking effect as will result from their interengagement with the work pieces. It will be understood from this disclosure that when the prong portions 24 are configurated as shown in Fig. 6, for the purpose of providing additional locking edges or teeth, their action does not in any way interfere with or modify the locking action of the locking prongs 14, and that if or whether the prongs 24 should be twisted reversely under the influence of the work pieces to substantially decrease or destroy their locking action, the prongs 14 will nevertheless be engaged with the work in the manner hereinbefore described in detail, to effectively retain the structure in assembled position.

Figs. 7 and 8 illustrate the preferred method of manufacturing the aforesaid lock washers and more particularly those disclosed in Figs. 1, 2 and 6. In practicing the method, the lock washers are made from a relatively flat sheet of material, indicated generally by the reference numeral 28. Throughout substantially its entire plane the sheet of material 28 has body portions of uniform thickness, indicated by the numeral 30. These body portions are spaced, however, by the relatively thickened portions 32 which extend longitudinally of the strip of sheet material, or horizontally, as viewed in Fig. 7. The strip of sheet material 28 may comprise a stock sheet formed preferably by rolling, it being understood that the surface configuration of the sheet will result from passing the product through a pair of rolls having a surface configuration corresponding thereto and such that the sheet material will be caused to flow into the region of the thickened portions. The strip of sheet material 28, shown in Figs. 7 and 8, has three longitudinally extending thickened portions or ribs 32 and, as clearly shown in Fig. 7, the lock washers may be formed therefrom by a series of stamping or pressing operations upon the material of the strip. It is thought not necessary to disclose the particular machine employed since this is known in the art. In any event, according to the preferred method of manufacture, the strip is passed step by step through a progressive die, the die first of all pushing an aperture 34 corresponding to the central aperture of the body portion. As a second step, the die punches the plurality of annularly disposed apertures 36 corresponding to the space between the prongs. It will be understood that in accordance with the subsequent steps in the process the prong portions will in known manner be twisted and then the entire washer will be blanked out of the sheet in its finished form.

There is disclosed in Figs. 9 to 14 an internal prong lock washer corresponding to the external tooth form shown in the previously described embodiment. Attention is particularly directed to the fact that in this embodiment the locking prongs 14 project radially inwardly from the body portion 12 of the lock washer and that the body portions are provided with the thickened work spacing sections 20. These work spacing sections 20 are spaced oppositely and diametrically arranged on the body portion and have substantially the same general configuration as the corresponding portions shown in Fig. 2, with the exception that the prong sections 24, similarly to the locking prongs, project radially inwardly from the body portion. It will be obvious from the present disclosure that the locking action of the washer providing the instant embodiment is substantially the same as the earlier embodiment in so far as the mutual coaction between the locking prongs 14 and the spacing portions 20 is concerned.

There are shown in Figs. 13 and 14 modified preferred embodiments comprising internal tooth locking washers corresponding to the external tooth locking washers shown respectively in Figs. 5 and 6. In other words, the washer of Fig. 13 comprises a relatively thickened section 20 devoid of prong portions, while the preferred structure of Fig. 14 discloses a work spacing thickened section having prong portions 24 which have been flexed, twisted or warped as hereinbefore described, for the production of an enhanced locking action.

There is disclosed in Fig. 15 a strip of sheet material configurated with thickened portions 32 as hereinbefore described, the sheet being punched to indicate the initial steps in the formation therefrom of internal tooth locking washers of the type disclosed in accordance with the present invention. According to this method the strip is progressively apertured, as indicated at 38, in the form of apertures having annular serrated peripheries, the apertures being arranged longitudinally and axially of the longitudinally extending ribs or thickened portions 32. Subsequently it will be understood that by means of progressive dies or any other suitable pressing, stamping or forming device the individual tooth portions which provide the tooth sections 14 in the finished lock washer will be first twisted, deflected or otherwise configurated to provide opposed locking edges or teeth, the individual washers being finally blanked out of the strip along the dotted lines indicated by the reference numeral 40.

Reference is now made to Figs. 16 to 21 of the drawings, which disclose more specifically an alternative modified locking element constructed in accordance with the present invention, the periphery of which is provided with the uniformly spaced radially projecting locking prongs 14 arranged annularly about a body portion 42 in a path uninterrupted by the aforementioned spacing sections. In accordance with the present embodiment, however, it is contemplated that predetermined work spacing means be provided for the purpose hereinbefore described in detail, and to this end it will be noted that the body portion 42 while being arranged in a flat plane is of predetermined increased thickness with respect to the thickness of the material forming the prongs 14. The additional thickness of the material projects equally on both sides of the plane of the relatively unthickened material to form the spacing shoulders 22 hereinbefore described. Figs. 18 to 21 illustrate the coaction of the present locking prongs and spacing sections 42 when operatively associated with opposed clamping members. Particular attention is directed to the fact that in accordance with this embodiment the individual prongs are arranged and configurated without regard for the particular design of the body portion of the washer and thus possess a configuration adapted to greatest locking efficiency. In other words, the thickened annular body portion 42 coacts with the locking prongs 14 in such a manner that the prongs are caused to bite into the work material at the exact predetermined angle for most efficient locking without necessitating any special variation in the form of the prongs from that determined to give the best results. This structure must be distinguished, therefore, from structures resulting from previous attempts to solve the instant problem, wherein the shape of the prongs had necessarily to be modified from most efficient locking form. In accordance with the instant preferred embodiment, the prongs are of substantially the same thickness throughout their radial extent and in addition are integrally joined to a body portion 42 which is stamped from a single sheet of metal and accordingly consists of a continuous annular piece of metal having uniform and regular physical characteristics throughout its length. The annular body portion accordingly must also for this reason be distinguished from washers configurated by bending from a strip of material, wherein the periphery is interrupted by spaced opposed end portions which may or may not be joined together but, as will be understood, are devoid of the improved uniform and efficient characteristics which result in accordance with the present invention.

Fig. 22 discloses a progressive die forming machine for the production of the lock washer of Figs. 16 to 21. The progressive die shown comprises an upper head 44 upon which are rigidly mounted a plurality of stamping, pressing and forming members 46, 48, 50, 52, 54 and 56. The upper head of the device coacts with the base portion 58 upon which is fixedly mounted the lower die plate 60. The strip plate 62 is operatively connected to the upper head 44 of the die through the agency of cylindrical spacing members 64 which threadedly engage the strip plate 62 as at 66 and are provided at their upper extremities with fillister head portions 68 slidable in a shoulder aperture 70. Springs 72 normally urge the die head into upper position wherein the fillister head 68 resides against the shoulder bottom portion of the aperture 70 for spacing the head with respect to the strip plate.

It will be understood that a flat strip of sheet material 74 is continuously passed stepwise through the die between the strip plate 62 and the lower die plate 60. The cylindrical plunger 46 adjacent the left end of the machine operates through corresponding cylindrical apertures in the strip plate and die base to punch an aperture which corresponds to the central aperture in the lock washer but is appreciably smaller than said central aperture. A plan view of the strip material passing through the die is shown in Fig. 23, and the aperture formed by the cylindrical punch 46 is indicated by the reference numeral 76.

It will be understood of course that the die shown in Fig. 22 will be arranged in a suitable pressing or punching machine to be periodically actuated so that the head thereof is forced downwardly with resect to the base portion to configurate the strip 74 as in the following manner. The strip is next advanced so that the aperture 76 resides axially over a forming member 78 of frusto-conical shape. The upper die forming member 48 rigidly secured to the upper head of the die has a lower face 80 comprising a continuous annular surface of frusto-conical form so that when it is brought down upon the strip 74, the sheet material about the periphery of the aperture 76 is bent upwardly into frusto-conical shape and accordingly, as a result of this action, the diameter of the central aperture is increased as shown in Fig. 23 to a size corresponding substantially to the final diameter of the central aperture in the lock washer.

The strip next passes to the third die in the series, the upper member 50 of which comprises a cylindrical punch having a short cylindrical pilot member 82 on its lower end, the diameter of which is identical with the diameter of the central aperture in the finished lock washer. The punch die 50 is sheathed at its lower end by the sleeve 84, having an annularly inwardly extending flange at its upper extremity coacting with an annular shoulder 86 to limit the relative positioning of the sleeve and the punch. A spring 88 urges the sleeve 84 slidably downwardly about the punch 50. It will be obvious, therefore, that when the strip is advanced so that the frusto-conical edge 80 is axially alined with the punch 50 and the device actuated to force the upper head downwardly, the pilot end 82 of the punch will enter the central preformed aperture while the end of the sleeve 84 will engage about the root or base of the frusto-conical lip 80. The material of this upstanding frusto-conical edge or lip portion 80, being thus confined radially between the pilot end 82 and the sleeve 84, will next be contacted by the lower annular surface of the punch die 50 and under the influence of the pressure created by the machine will be formed into the annular thickened portion 42 as shown clearly in Figs. 22 and 23. Attention is particularly directed to the fact that the lower die plate 60 comprises a sleeve insert 90 having its upper annular surface spaced below the upper surface of the die plate a predetermined distance corresponding to the distance that the thickened portion projects downwardly beyond the normal lower bounding plane of the unthickened metal. By virtue of this forming operation the metal surrounding the aperture formed by the punch 46 is in effect upset or caused to flow inwardly to provide the annular thickened section 42 with its rectangular sectional configuration having flat upper and lower surfaces. The subsequent operations of the die form the radially extending prongs, effect final configuration thereof and then separate the final washer from the sheet of material 74 by a shearing step. The first of these three operations is carried out by the die 52, comprising at its lower end a series of annularly spaced fingers 92 having a sectional configuration corresponding to the space between the prongs 14, and adapted to shear or punch the apertures 36, Fig. 23. The die plunger 54 coacts with a lower die insert 94, both having their surfaces configurated to twist or deflect the prongs 14 to their final form, while the die plunger 56 has a pilot end 96 engaging in the central aperture of the washer and coacting with the lower die plate to shear the finished washer from the strip 74. The lower face of the die plunger 56 is configurated with a plurality of indentations 97 corresponding in form and position with the twisted prongs, so as to accommodate the prongs during the final shearing step.

It will be apparent from the foregoing that the present invention comprehends the provision of a method which may be carried out by means of a progressive die or any other equivalent forming means which consists in forming an aperture corresponding to the central aperture of the die, upsetting the material about the edges of the aperture to form the annular thickened body portion 42, and subsequently punching and shaping the plurality of spaced radial prongs which extend integrally from the body portion, as preferably to unaffect the normal predetermined thickness of the sheet material from which they originate. The present invention comprehends of course the provision of means, not shown, for periodically progressing the flat strip of sheet material in step by step relationship through the die to positions where it is properly alined for each subsequent progressive forming operation.

There is disclosed in Figs. 25 to 29, inclusive, a yet further modified preferred form of locking member constructed in accordance with the present invention and comprising in the illustrative form shown an internal tooth lock washer, the body portion 12 of which comprises a flat continuous sheet of material of substantially the same transverse thickness as the thickness of the material forming the prongs 14. Attention is directed to the fact that the nine locking prongs 14 are arranged in groups of three, each group being separated by a thickened work spacing prong 100. More particularly, the work spacing prongs 100 are symmetrically arranged about the inner periphery of the body portion 12, accordingly being arranged thereon one hundred twenty degrees apart. It will be understood that the configuration and thickness of these work spacing prongs 100 will be determined in accordance with the considerations hereinbefore discussed more in detail for permitting maximum locking efficiency of the prongs 14.

There is disclosed in Fig. 30 a die structure of the progressive type, having in general the same construction as the progressive die shown in Fig. 22, but modified in order to render it adaptable to the production of the present modified locking element. More particularly, the die of Fig. 30 comprises modified die plungers 102 to 114, inclusive. The left hand plunger 102 as viewed in the figures is adapted to punch the central aperture of the lock washer but is provided with axially extending peripheral grooves 116 of predetermined configuration so that the final aperture 118, see Fig. 31, has a circular periphery interrupted by three equidistant radially inwardly extending tabs 120. The next succeeding die plunger 104 provides a sleeve having at its lower end a flat, horizontal annularly extending surface interrupted by the segmental upwardly inclined surfaces 122. These surfaces 122 coact with three correspondingly spaced inclined ramp portions 124 formed on the lower die member. When the portion of the strip 74, apertured as at 118, is alined with respect to the instant coacting die surfaces and the upper head of the die is forced downwardly, the tab portions 120 residing directly over the inclined ramps 124 will be severed or sheared from the sheet material 74 along lines coincidental with the sides of the tabs 120 and the resulting tabs 126 will be configurated so that they incline radially upwardly as shown in Fig. 30.

The next succeeding plunger has substantially the same configuration as the die plunger 50 hereinbefore described in connection with the die disclosed in Fig. 22. It will be obvious from this disclosure that the previously configurated aperture bounded by the upwardly inclined fingers 126, when alined with the die plunger 106 will be acted upon to upset the material of the tabs 126 and thicken them on either side of the bounding planes of the sheet strip 74 to provide the thickened or work spacing portions 100. The subsequent steps in the operation of the instant progressive die comprise shearing or stamping out portions of the periphery of the aperture corresponding to the space between the prongs of the final washer, twisting or otherwise configurating the prongs 14 and blanking out the finally completed washer. The plungers 108, 110, 112 of the present die are therefore substantially the same in structural configuration as the corresponding parts 52, 54, 56, respectively, of the die in Fig. 22. The additional cylindrical die punch 114 serves to finally separate and clear the finished washer from the strip and from the die.

It will be apparent from the foregoing detailed description that the present invention contemplates the provision of lock washers preferably of continuous regular configuration in which work spacing portions are arranged so that they are located at a position or positions in the plane of the washer which are displaced or removed from the locking prongs. Moreover, the washer has substantially uniform peripheral locking characteristics, since it is truly integral in character, being formed from a continuous piece of metal, preferably spring metal, which is therefore of uniform uninterrupted physical character.

Thus while the work pieces are spaced at all times a carefully predetermined distance to permit maximum locking efficiency, the locking members are not in any way modified to minimize this effect. In particular reference to the first and last described embodiment of the present invention, it should be noted that the body portion likewise of the washer will be operatively spaced from the work pieces and thus is free to assume a resilient sinuous annular configuration under the influence of the twisting strains imposed by the so-called unwinding of the prongs. In other words, the twisting of the prongs resulting from the tightening of the work pieces may create a strain transmitted through the root portions thereof to the body of the washer to resiliently deflect the body in a series of undulations which will enhance the resilient locking effect of the washer in a great degree. This result obviously will not be obtained in non-continuous lock washer constructions wherein the body portion is interrupted or of non-homogeneous character.

It will be further understood from the foregoing that the present invention is not limited to the particular type of twisted tooth herein, which is shown merely for purposes of illustration. The present invention contemplates various other forms of washer teeth or locking or biting edges, for example, comprising sections of stock variously deflected, warped or otherwise positioned on opposite sides of the bounding planes of the body.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In the method of producing lock washers having work spacing, thickened sections adapted to determine the minimum spacing of opposed washer engaging work pieces which comprises forming a lock washer having a body portion and work engaging teeth by means of die pressing operations from a sheet of material of substantially uniform thickness the improvement which comprises forming at spaced preselected points in the plane of said washer flat relatively thickened areas, by causing said washer forming sheet material to flow into said thickened portions, said thickened areas projecting substantially equally on either side of the central plane of said washer.

2. In the method of producing lock washers having at least one work spacing, thickened section adapted to determine the minimum spacing of opposed washer engaging work pieces which comprises forming a lock washer having a body portion and work engaging teeth by means of die pressing operations from a sheet of material of substantially uniform thickness the improvement which comprises forming at a preselected point in the plane of said washer a flat relatively thickened area, by causing said washer forming sheet material to flow into said thickened portion, said thickened area projecting substantially equally on either side of the central plane of said washer.

3. In the method of producing lock washers having work spacing, thickened sections adapted to determine the minimum spacing of opposed washer engaging work pieces which comprises forming a lock washer having a body portion and work engaging teeth by means of die pressing operations from a sheet of material of substantially uniform thickness, the improvement which comprises forming at spaced preselected points in the plane of said washer flat relatively thickened areas, by upsetting to cause said washer forming sheet material to flow into said thickened portions without varying the thickness of the portions of the washer which have not been subjected to upsetting, said thickened areas projecting substantially equally on either side of the central plane of said washer.

4. In the process of forming lock washers from a sheet of material, the steps which comprise upsetting a predetermined portion of said sheet only, to produce a laterally thickened portion of generally predetermined area by deforming a preselected portion of said sheet of materially laterally out of the plane of said sheet to shorten the length of said portion in the direction of said plane, and returning said deformed portion substantially into the plane of the original plane of said sheet, while retaining said deformed portion substantially within said shortened limits.

5. In the process of forming lock washers from a sheet of material, the steps which comprise upsetting a predetermined portion of said sheet only, to produce a laterally thickened portion of generally predetermined area by bending a preselected portion of said sheet of material at an angle to the plane of said sheet material to shorten the length of said section in a direction parallel to said plane and forcing said bent portion substantially into the plane of the original sheet, while retaining said section substantially within limits defined by said shortened length of the section.

6. In the process of forming lock washers from a sheet of material, the steps which comprise upsetting a predetermined portion of said sheet only, to produce a laterally thickened portion of generally predetermined area by deforming a portion of said sheet adjacent a margin thereof laterally out of the plane of the sheet without substantially thinning the deformed portion, whereby to bring the margin of the deformed portion inwardly of the original margin in a direction in the plane of the material, and forcing said deformed portion substantially toward the original plane, while retaining the margin of the deformed portion inwardly of said original margin.

7. In the process of forming lock washers, by progressive forming operations, from a sheet of material, the steps which comprise upsetting a predetermined portion of said sheet only, to produce a laterally thickened work spacing portion of generally predetermined area by bending a portion of said sheet adjacent a margin thereof laterally out of the plane of the sheet to offset the margin of the deformed portion inwardly of the original margin in a direction in the plane of the material, and forcing said deformed portion substantially into the original plane, while retaining the margin of the bent portion substantially inwardly offset whereby to thicken the said portion of the sheet.

8. The process of forming lock washers from a sheet of material by progressive forming operations, comprising deforming a preselected portion of said sheet material laterally out of the plane of the sheet in a direction extending at an angle to said sheet, while retaining the preselected portion integral with said sheet along at least one edge thereof, whereby to offset an opposed margin of said deformed portion in a direction in the plane of the sheet towards the other said margin, and pressing said deformed portion substantially into said original plane, while retaining the margins of said deformed portion substantially within said offset limits, whereby to cause the metal of said deformed portion to flow into an area of decreased longitudinal extent in the plane of said sheet.

9. A lock washer including a continuous annular body of sheet material and a plurality of locking teeth extending from the bounding planes of the body and configurated to engage opposed work surfaces to prevent retrograde movement of the said work surfaces, said body having work spacing portions associated therewith of predetermined thickness greater than the thickness of the material forming the teeth whereby to limit the minimum space between the said opposed work surfaces when clamped together under the influence of a severe force, and to permit the teeth at all times to engage the surfaces in predetermined locking relationship, said work spacing portions occupying a portion only of the circumferential extent of the washer.

10. A lock washer including a continuous annular body of sheet material and a plurality of prongs extending outwardly from the body and comprising locking teeth configurated to engage opposed work surfaces to prevent retrograde movement of the said work surfaces, said washer having work spacing portions associated therewith of predetermined thickness greater than the thickness of the material forming the work engaging prongs whereby to limit the minimum space between the said opposed work surfaces when clamped together under the influence of a severe force, and to permit the work engaging prongs at all times to engage the surfaces in predetermined locking relationship, said work spacing portions occupying a portion of at least one of said prongs.

11. In the method of producing lock washers from material comprising forming a continuous body portion for a lock washer, forming prongs for said body portion, providing said prongs with opposed biting portions adapted to inter-engage with work surfaces to lock said work surfaces against relative retrograde movement, the improvement which comprises forming at a predetermined point in the plane of said washers relatively thickened work spacing portions by upsetting said washer forming sheet material to cause the sheet material to flow laterally at said thickened portions to increase the ultimate thickness of said material laterally with respect to the plane of said washer.

12. A lock washer including a continuous annular body of sheet material and a plurality of locking teeth extending from the bounding planes of the body and configurated to engage opposed work surfaces to prevent retrograde movement of the said work surfaces, said washer having work spacing portions associated therewith, said work spacing portions being thickened laterally with respect to the central plane of the washer stock whereby to permit the teeth at all times to engage the surfaces in a predetermined locking relationship, said work spacing portions occupying a portion only of the circumferential extent of the washer.

13. A lock washer including an annular body portion and a plurality of yieldable locking elements extending from a margin of the said body portion providing teeth normally projecting beyond the bounding planes of said body and configurated to engage opposed work surfaces when the washer is clampingly engaged therebetween and work spacing portions marginally interposed between certain of said teeth providing abutments projecting outwardly beyond the said bounding planes of the body and operative to engage the work surfaces when the lock washer is clamped against the work to prevent flattening of the locking elements.

14. A lock washer including an annular body portion and a plurality of yieldable locking elements extending from a margin of the said body portion providing teeth normally projecting beyond the bounding planes of said body and configurated to engage opposed work surfaces when the washer is clampingly engaged therebetween and work spacing portions marginally interposed between certain of said teeth providing abutments projecting outwardly beyond the said bounding planes of the body and operative to engage the work surfaces when the lock washer is clamped against the work to prevent flattening of the locking elements, said teeth projecting from said bounding planes substantially beyond said abutments.

15. A lock washer including an annular body portion and a plurality of yieldable locking elements extending from a margin of the said body portion providing teeth normally projecting beyond the bounding planes of said body and configurated to engage opposed work surfaces when the washer is clampingly engaged therebetween and work spacing portions marginally interposed between certain of said teeth providing abutments projecting outwardly beyond the said bounding planes of the body and operative to engage the work surfaces when the lock washer is clamped against the work to prevent flattening of the locking elements, said work spacing portions being located radially and substantially completely beyond said margin of the body portion.

16. A lock washer as defined in claim 13, wherein the locking elements extend from the external margin of said body portion.

17. A lock washer as defined in claim 13, wherein the locking elements extend from the internal margin of said body portion.

18. A lock washer as defined in claim 13 wherein the locking elements comprise twisted prongs.

OUGLJESA JULES POUPITCH.

CERTIFICATE OF CORRECTION.

Patent No. 2,234,194. March 11, 1941.

OUGLJESA JULES POUPITCH.

It is hereby certified that error appears in the printed specification of the above numbered patent requiring correction as follows: Page 2, second column, line 54, for the word "in" read --is--; page 3, second column, line 29, for "pushing" read --punching--; page 6, second column, line 20, claim 4, for "materially" read --material--; and that the said Letters Patent should be read with this correction therein that the same may conform to the record of the case in the Patent Office.

Signed and sealed this 20th day of May, A. D. 1941.

(Seal)

Henry Van Arsdale,
Acting Commissioner of Patents.